United States Patent
Potrawa et al.

(10) Patent No.: US 9,834,660 B2
(45) Date of Patent: Dec. 5, 2017

(54) RARE EARTH METAL COMPLEXES THAT EXCITE IN THE LONG UV WAVELENGTH RANGE

(75) Inventors: Thomas Potrawa, Seelze (DE); Joachim Schulz, Pohle (DE)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1035 days.

(21) Appl. No.: 11/823,734

(22) Filed: Jun. 28, 2007

(65) Prior Publication Data

US 2009/0000509 A1    Jan. 1, 2009

(51) Int. Cl.
| | |
|---|---|
| C08K 5/00 | (2006.01) |
| C09K 11/06 | (2006.01) |
| B41M 5/00 | (2006.01) |
| C09D 11/32 | (2014.01) |
| C09D 11/50 | (2014.01) |
| C09D 11/037 | (2014.01) |

(52) U.S. Cl.
CPC .......... C08K 5/0041 (2013.01); C08K 5/0091 (2013.01); C09D 11/037 (2013.01); C09D 11/32 (2013.01); C09D 11/50 (2013.01); C09K 11/06 (2013.01); B41M 5/0023 (2013.01)

(58) Field of Classification Search
CPC .................. C09K 2211/182; C09K 2211/1081
See application file for complete search history.

(56) References Cited

U.S. PATENT DOCUMENTS

| | | | |
|---|---|---|---|
| 4,701,420 A | 10/1987 | Thunberg et al. | |
| 5,320,969 A * | 6/1994 | Bauer et al. | 436/84 |
| 5,837,042 A | 11/1998 | Lent et al. | 106/31.14 |
| 6,245,711 B1 | 6/2001 | Halbrook, Jr. | |
| 6,395,862 B1 | 5/2002 | Lemmon et al. | |
| 6,513,921 B1 | 2/2003 | Houle | 347/96 |
| 6,538,805 B1 | 3/2003 | Norwood et al. | 359/341.5 |
| 6,905,538 B2 | 6/2005 | Auslander | 106/31.15 |
| 7,097,700 B2 | 8/2006 | Shimizu | |
| 7,108,742 B2 | 9/2006 | Hall-Goulle et al. | 106/31.27 |
| 7,147,801 B2 | 12/2006 | Kozee et al. | 252/301.16 |
| 7,192,474 B2 | 3/2007 | Auslander et al. | 106/31.32 |
| 2003/0089273 A1 | 5/2003 | Potrawa | 106/31.15 |
| 2004/0132228 A1 | 7/2004 | Magno et al. | 438/99 |
| 2007/0020485 A1 | 1/2007 | Kita et al. | |

FOREIGN PATENT DOCUMENTS

| | | |
|---|---|---|
| JP | 61231440 A | 10/1986 |
| JP | 8239607 | 9/1996 |
| JP | 2003268272 A | 9/2003 |
| JP | 2004521169 A | 7/2004 |
| JP | 2005048137 A | 2/2005 |
| JP | 2006298777 A | 11/2006 |
| JP | 200984267 A | 4/2009 |
| WO | 03053980 A1 | 7/2003 |
| WO | WO2005040292 | 5/2005 |

OTHER PUBLICATIONS

Tralster, G.L., et al., "Water-soluble sulfonated chromogenic reagents of the ferroin type and determination of iron and copper in water, blood serum, and beer with the tetraammonium salt of 2,4-bis(5,6-diphenyl-1,2,4-triazin-3-yl)pyridinetetrasulfonic acid", 1976, Analytical Chemistry, 48(8), pp. 1216-1220.*

Silva, C.R., et al., "Highly luminescent Eu(III) complexes with 2,4,6-tri(2-pyridyl)-1,3,5-triazine ligand: Synthesis, structural characterization, and photoluminescence studies", 2006, Polyhedron, 25(17), pp. 3449-3455.*

Flock, J., et al., "Spectrophotometric determination of Fe(II) and total iron with 2,4,6-TRI(2'-pyridyl)-1,3,5-triazine in iron ores and related industrial products", 1993, 346, pp. 667-670.*

Wietzke, R., et al., "Crystal Structure and Solution Fluxionality of Lanthanide Complexes of 2,4,6,-Tris-2-pyridyl-1,3,5-triazine", 1999, 38, pp. 3581-3585.*

Gallagher, P.K., et al. "Absorption and Fluorescence of Europium(III) in Aqueous Solutions ", Journal Chem. Phys., 1964, . . . p. 3061-3069.*

(Continued)

Primary Examiner — Michael G Hartley
Assistant Examiner — Lance Rider
(74) Attorney, Agent, or Firm — Lorenz & Kopf, LLP

(57) ABSTRACT

There is provided rare earth metal complexes of formula (I):

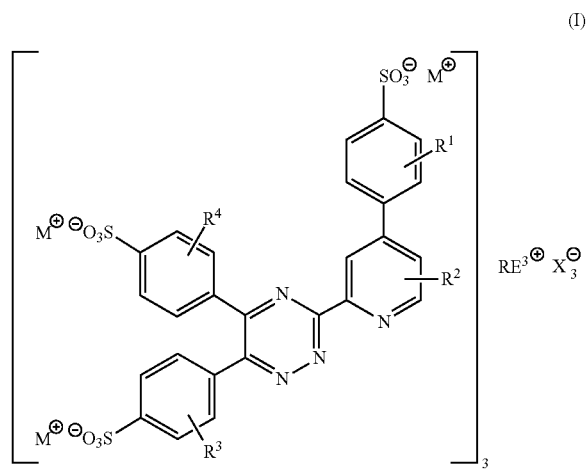

(I)

wherein M is a cation, RE is a rare earth metal; X is a counter anion; and $R^1$, $R^2$, $R^3$, and $R^4$ are each independently selected from hydrogen, alkyl of 1-8 carbon atoms, aryl, halo, and alkoxy. Also provided is a composition of europium bis(2,2'-bipyridine-N,N')-trinitrate with a diketonate dopant. The disclosure also provides processes for preparing the rare earth metal complexes. A mark comprising the rare earth metal complexes, and a method of applying the mark, are disclosed. The rare earth metal complexes may be used in printing systems, and for security applications.

27 Claims, No Drawings

(56) References Cited

OTHER PUBLICATIONS

Hoyle, W.C., et al., "2,4,6-tris{2'[4'-(p-sulfophenyl)pyridyl]}-s-triazine: a new analytical reagent for the spectrophotometric determination of iron", Talanta, 1980, pp. 963-969.*
Patton, W. F., et al., "Protein Detection Using Reversible Metal Chelate Stains", Methods in Enzymology, 1999, pp. 331-339.*
Denecke, M.A., et al., "Characterization and Comparison of Cm(III) and Eu(III) Complexed with 2,6-Di(5,6-dipropyl-1,2,4-triazin-3-yl)pyridine Using EXAFS, TRFLS, and Quantum-Chemical Methods", Inorganic Chemistry, 2005, 8418-8425.*
Wei, B., et al., "Rare earth elements in human hair from a mining area of China", Ecotoxicology and Environmental Safety, 2013, pp. 1-6.*
Hobarth, K., et al., "Rare-earth elements in urinary calculi ", Urilogical Research, 1993, pp. 261-264.*
Charles et al, J; *"Properties of Some Europium Laser Chelates Derived from Benzoyltrifluoroacetone"*; Inorg. Nucl.Chem., 1996; vol. 28, pp. 3005-3018.
European Patent Office, Supplementary European Search Report dated Apr. 1, 2015 for Application No. EP08779844.3.

\* cited by examiner

RARE EARTH METAL COMPLEXES THAT EXCITE IN THE LONG UV WAVELENGTH RANGE

BACKGROUND OF THE INVENTION

1. Field of the Invention

The present disclosure relates to rare earth metal complexes of 5,6-diaryl-3-(2-pyridyl)-1,2,4-triazines and a process for preparing the same. The present disclosure also relates to europium dipyridyl nitrates with diketone dopants and a process for preparing the same. The rare earth metal complexes of this disclosure may be used as pigments in ink compositions for printing systems and for security applications.

2. Description of the Related Art

Certain rare earth metal complexes that are invisible under normal lighting conditions, yet produce strong emissions in the visible region when irradiated with ultraviolet (UV) light, are known and have been used in ink compositions. For example, JP 8239607A describes europium diketonate complexes with butylammonium salt as the counter anion that have been used in ink jet applications. U.S. Patent Application Publication No. 2003/0089273 describes europium-ammonium chelates that are not visible under ordinary light conditions, yet fluoresce when exposed to certain wavelengths of UV light, and which have increased solubility in alcohol and alcohol/water solutions as compared with known europium complexes. Known europium complexes include $Eu(AA)_3Phen$, $Na(Eu(AA)_4)$, $HPip(Eu(AA)_4)$, $Eu(BA)_3Phen$ and $Na(Eu(BA)_4)$, where Eu is Europium, AA is acetylacetone, HPip is homopiperazine, and Phen is 1,10-phenanthroline. U.S. Pat. No. 5,837,042, which is incorporated herein by reference, describes ink jet compositions, used in security markings, having a colorant of a rare earth metal and certain chelating ligands that emit light when irradiated by UV light. U.S. Pat. No. 6,905,538 describes inks containing certain rare earth complexes, used in postal applications, which are invisible to the unaided eye, yet fluoresce when irradiated with short wavelength UV radiation.

Presently, rare earth metal complexes that fluoresce brightly when irradiated with UV light are coordinated with organic ligands such as diketones, carbonic acid, and pyridyl or phenanthryl coordinators. A known rare earth metal diketonate complex of this type is europium tris-benzoyltrifluoro-acetone-diketonate. See R. G. Charles, J. Inorg. Chem. (1966), vol. 28, pages 3005-3018.

Disadvantages of the known rare earth metal complexes include: (1) poor solubility in water; (2) insufficient stability in water for inkjet applications; and (3) an excitation range that is limited to the UV-C or short UV wavelength range (wavelengths less than 220 to 300 nanometers). As such, there is a need for rare earth metal complexes that: (1) possess a high degree of solubility in water and/or organic solvents; (2) are sufficiently stable in water to enable their use in inkjet applications among others; and (3) exhibit excitation in the long UV wavelength range (between 350 to 390 nm).

SUMMARY OF THE INVENTION

While triazine ligands, such as 3-(2-pyridyl)-5,6-bis(4-phenylsulfonic acid)-1,2,4-triazine, monosodium salt (available as FERROZINE™), are generally known in the art, there are no known europium, gadolinium, or terbium complexes of 5,6-diphenyl-3-(2-pyridyl)-1,2,4 triazine ligands. In one embodiment, the present disclosure provides rare earth metal complexes of 5,6-diphenyl-3-(2-pyridyl)-1,2,4-triazines, trisulfonic acid salt, represented by formula (I):

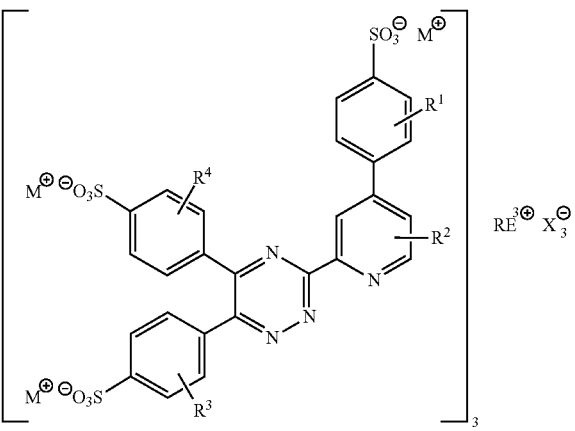

(I)

wherein:
M is a cation;
RE is a Rare Earth metal;
X is a counter anion; and
each $R^1$, $R^2$, $R^3$, and $R^4$ is independently selected from hydrogen, alkyl of 1-8 carbon atoms, aryl, halo, and alkoxy.

It is believed that the rare earth metal complexes of formula (I) are soluble in water and/or organic solvents, in part because of the presence of the multiple sulfate groups. The rare earth metal complexes of formula (I) fluoresce brightly in the visible region when irradiated with long UV wavelengths of light.

The present disclosure also provides for compositions comprising the rare earth complexes of formula (I) and at least one carrier. The compositions containing the complexes of formula (I) are soluble in water and/or alcohol solutions, and thus are suitable for use as pigments (or dyes or colorants) in inks that may be used in a variety of printing systems, including ink jet printing. Ink compositions containing the rare earth metal complexes of formula (I) exhibit excitation in the long UV wavelength range, have narrow emission spectra, and show a high degree of lightfastness, and so are also useful as pigments or dyes for various security applications.

The present disclosure also provides a process for preparing rare earth metal complexes of formula (I):
by contacting:
(i) a trialkali salt of a 5,6-diaryl-3-(2-pyridyl)-1,2,4-triazine trisulfonic acid derivative, represented by formula (II):

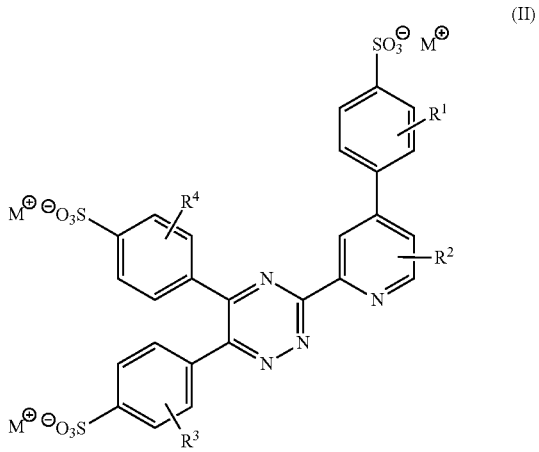

wherein:

M is a cation; and each $R^1$, $R^2$, $R^3$, and $R^4$ is independently selected from hydrogen, alkyl of 1-8 carbon atoms, aryl, halo, and alkoxy;

and (ii) a rare earth metal salt represented by the formula:

wherein RE is a rare earth metal; and

X is a counter anion;

wherein the step of contacting reactants (i) and (ii) is carried out in the presence of a solvent, and at a temperature and length of time sufficient to produce the rare earth complexes of formula (I). The process may optionally include the steps of evaporating the solvent, cooling the solution to precipitate the reaction product, and/or recrystallizing the reaction product to increase the purity.

The present disclosure also provides new formulations and compositions of europium dipyridyl nitrates, such as europium bis(2,2'-bipyridine-N,N')-trinitrate, combined with one or more diketone dopants, and a process for preparing the same. The resulting formulations emit fluorescence when irradiated with long UV wavelength range light, have good stability of the fluorescence, have good solubility in solvents such as water and/or alkyl alcohols, and can be used as pigments, dyes, or colorants for printing systems or security applications.

The present disclosure also provides a mark comprising a rare earth metal complex of formula (I), and/or a europium dipyridyl nitrate complex. The rare earth metal complexes in the mark exhibit an excitation spectrum in the long UV wavelength ranges, and are soluble in water and organic solvents that are suitable for water-based ink printing systems. The rare earth metal complexes in the mark are fluorine-free, and are environmentally friendly.

The disclosure also provides for a method for applying the mark having a formulation of the rare earth metal complexes of formula (I) and/or a europium dipyridyl nitrate to an article of commerce by printing, using a printer selected from the group consisting of ink jet, thermal, piezo, and laser printers.

DETAILED DESCRIPTION OF THE INVENTION

Rare Earth Metal Complexes of 5,6-diaryl-3-(2-pyridyl)-1,2,4-triazines

In one embodiment, the present disclosure provides rare earth metal complexes of 5,6-diaryl-3-(2-pyridyl)-1,2,4-triazines, trisulfonic acid salt, represented by formula (I):

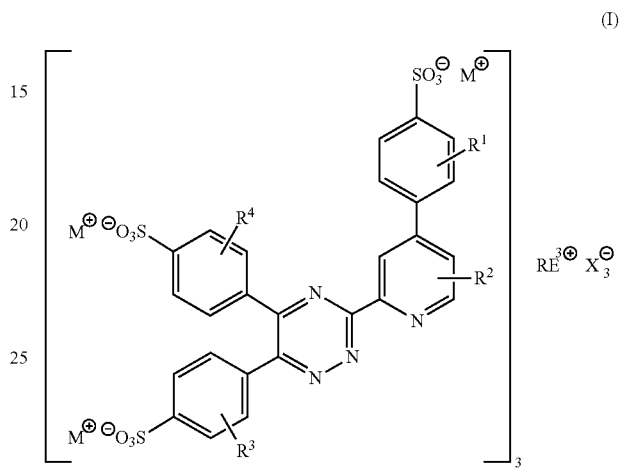

wherein:

M is a cation;

RE is a rare earth metal;

X is a counter anion; and each $R^1$, $R^2$, $R^3$, and $R^4$ is independently selected from hydrogen, alkyl of 1-8 carbon atoms, aryl, halo, and alkoxy.

"Cation," as used herein, means a positively charged ion. Examples of cations include, but are not limited to, $Na^+$, $K^+$, $NH_4^+$, $H_3O^+$, $H^+$, $NO^+$, $Ca^{2+}$, $Cr^{2+}$, $Cu^{2+}$, $Fe^{2+}$, $Mg^{2+}$, $Pb^{2+}$, $Sr^{2+}$, $Sn^{2+}$, $Zn^{2+}$, $Al^{3+}$, $Cr^{3+}$, $Fe^{3+}$, $Mn^{3+}$, and $Sn^{4+}$. "Counter anion" (or "anion"), as used herein, means a negatively charged ion. Examples of counter anions include but are not limited to, $H^-$, $F^-$, $Cl^-$, $Br^-$, $I^-$, $O^{2-}$, $S^{2-}$, $N^{3-}$, $AsO_4^{3-}$, $AsO_3^{3-}$, $PO_4^{3-}$, $HPO_4^{2-}$, $H_2PO_4^-$, $SO_4^{2-}$, $HSO_4^-$, $NO_3^-$, $NO_2^-$, $SO_3^{2-}$, $ClO_4^-$, $ClO_3^-$, $ClO_2^-$, $IO_3^-$, $BrO_3^-$, $CO_3^{2-}$, $CrO_4^{2-}$, $HCO_3^-$, $Cr_2O_7^{2-}$, $CH_3COO^-$, $HCOO^-$, $CN^-$, $NH_2^-$, $OH^-$, $O_2^-$, $C_2O_4^{2-}$, $MnO_4^-$, and $SCN^-$.

In a preferred embodiment of formula (I):

M is an alkali metal cation;

RE is a rare earth metal selected from Europium (Eu), Gadolinium (Gd), Terbium (Tb), and/or mixtures thereof;

X is a halide such as fluoride, chloride, bromide, or iodide; and $R^1$, $R^2$, $R^3$, and $R^4$ are each independently selected from hydrogen, alkyl of 1-8 carbon atoms, aryl, halo, and alkoxy.

A more preferred embodiment of the present disclosure is a rare earth metal complex of formula (I) wherein:

M is selected from sodium ($Na^+$), potassium ($K^+$), and/or mixtures thereof;

RE is selected from Eu, Gd, Tb, and/or mixtures thereof, and more preferably Eu;

X is a halide (fluoride, chloride, bromide, or iodide), and more preferably chloride; and $R^1$, $R^2$, $R^3$, and $R^4$ are each independently selected from hydrogen, alkyl of 1-8 carbon atoms, aryl, halo, and alkoxy, and more preferably, each of $R^1$, $R^2$, $R^3$, and $R^4$ is hydrogen.

Thus, a preferred rare earth complex is Europium[tris-4,4'-[3-[4-(4-sulfophenyl)-2-pyridinyl]-1,2,4-triazine-5,6-diphenyl]-bis-benzenesulfonic acid, trisodium)] chloride, that can be represented by formula (IV):

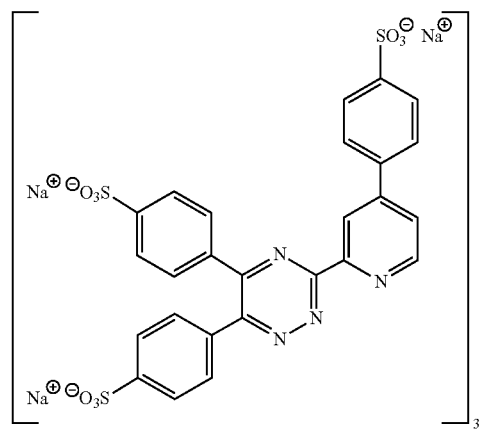

(IV)

The present disclosure also provides a process for the preparation of rare earth complexes represented by formula (I):

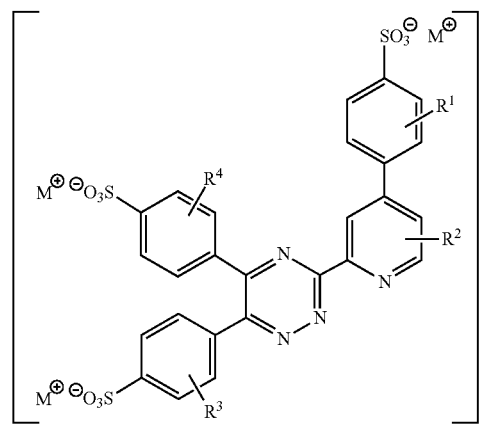

(I)

wherein:

M is a cation;

RE is a rare earth metal;

X is a counter anion; and each $R^1$, $R^2$, $R^3$, and $R^4$ is independently selected from hydrogen, alkyl of 1-8 carbon atoms, aryl, halo, and alkoxy;

wherein the process includes the step of contacting:

(i) a trialkali salt of a 5,6-diaryl-3-(2-pyridyl)-1,2,4-triazine trisulfonic acid derivative, represented by formula (II):

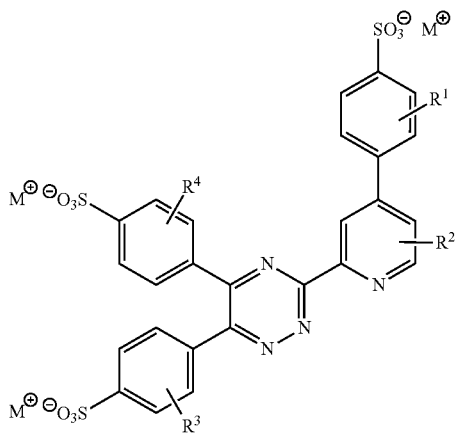

(II)

wherein:

M is a cation; and $R^1$, $R^2$, $R^3$, and $R^4$ are each independently selected from hydrogen, alkyl of 1-8 carbon atoms, aryl, halo, and alkoxy;

and (ii) a rare earth metal salt represented by the formula $$RE^{3+}(X^-)_3$$

wherein:

RE is a rare earth metal; and

X is a counter anion;

wherein the step of contacting is carried out in the presence of a solvent, and at a temperature and length of time sufficient to produce a rare earth complex of formula (I).

The process may optionally further include one or more of the following steps: partially or completely evaporating the solvent; cooling the solution to a sub-ambient temperature to precipitate the reaction product; recrystallizing the reaction product to increase the level of purity.

In the process of preparation, the contacting step is carried out at a temperature from about 10° C. to about 100° C., at an atmospheric pressure from about 0.1 atmosphere (atm) to about 100 atm, and for a length of time from about 0.01 seconds to about 300 hours.

More preferably, the contacting step is carried out: at an ambient or superambient temperature, most preferably between about 15° C. to about 35° C.; at a pressure of about 0.50 atm to about 10 atm; and for a length of time from about 5 minutes to about 5 hours, and most preferably from about 10 minutes to about 30 minutes. Ambient temperature, as used herein, means a temperature from about 15° C. to about 35° C. Superambient temperature, as used herein, means a temperature from about 35° C. to about 100° C.

The process of preparing the rare earth metal complexes of formula (I) can be performed either as a batch process or as a continuous process.

The reactor for the process can further include a diluent, which may be a solvent or mixture of solvents, such as water, ethanol, and/or aliphatic ketones.

Preferably, at least 10 wt % of the reactants are converted to the rare earth metal complexes of formula (I) by this process. More preferably, at least 80 wt % of the reactants are converted to rare earth metal complexes of formula (I), and most preferably, at least 90% of the reactants are converted to the rare earth metal complex of formula (I). Yields are nearly quantitative after extraction of the solvent water.

The rare earth metal complexes of formula (I) are soluble in water and in water-alcohol mixtures. The resulting solutions contain at least 1 weight-percent (wt %), and more preferably, at least 5 wt % of the rare earth metal complex. Water-solubility is an advantage of the rare earth complexes of formula (I), which permits their use as pigments or dyes in ink compositions that can be used in various printing systems, including ink jet printing. In addition, the rare earth metal complexes of formula (I) have narrow emission spectra when irradiated with long UV wavelength radiation light, which is an advantage for use in ink compositions used for security applications.

In a preferred embodiment, europium chloride may be combined with 5,6-diphenyl-3-(2-pyridyl)-1,2,4-triazines, 4,4'-[3-[4-(4-sulfophenyl)-2-pyridinyl]-1,2,4-triazine-5,6-diyl]bis benzenesulfonic acid, trisodium salt by the above process to provide a solution of europium[tris-4,4'-[3-[4-(4-sulfophenyl)-2-pyridinyl]-1,2,4-triazine-5,6-diphenyl]-bis-benzenesulfonic acid, trisodium)] chloride that can be represented by formula (IV):

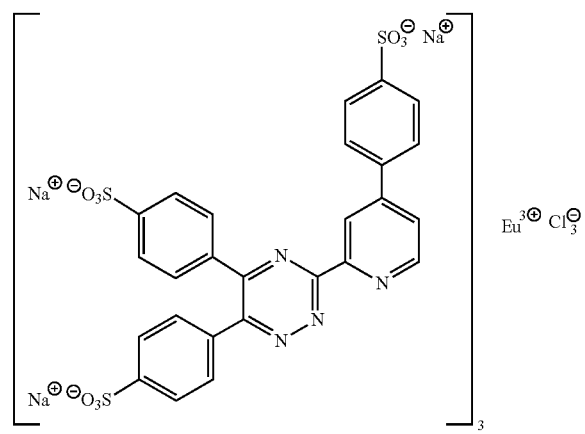

(IV)

After evaporation of the water, the resulting rare earth metal complex of formula (IV) fluoresces brightly in the visible region upon irradiation with long UV wavelength light. However, another cation may be substituted for sodium, and another halide for the chloride counter anion, to provide stable solutions by the disclosed process.

The rare earth metal complex of formula (IV) demonstrates a high degree of lightfastness as compared with known rare earth metal complexes. As used herein, "lightfast," "lightfastness," and "light stable" are used interchangeably as measures of the degree of stability of fluorescence when a compound or composition is irradiated with light energy. The lightfastness of the europium complex of formula (IV), Europium[tris-4,4'-[3-[4-(4-sulfophenyl)-2-pyridinyl]-1,2,4-triazine-5,6-diphenyl]-bis-benzenesulfonic acid, trisodium)] chloride, was compared with a known europium diketonate complex, europium tris-benzoyltrifluoro-acetone, as follows: a 5% solution containing formula (IV) (in water) and a solution of europium-tris-benzoyltrifluoro-acetone (in ethanol) were prepared. One drop from each solution was placed onto a piece of filter paper. The drops were dried in air. The dried drops were then irradiated with SOL2 equipment (simulation of sunlight behind window glass). The starting fluorescence intensity under 366 nm wavelength for the drop containing europium-tris-benzoyl-trifluoro-acetone was 19.4 cd/m², and the starting fluorescence intensity for the drop containing formula (IV) was 11.5 cd/m². After 20 h of irradiation at 366 nm, the fluorescence intensity for the drop containing europium-tris-benzoyltrifluoro-acetone had decreased to only 3.2 cd/m², as compared with a fluorescence intensity for the drop containing formula (IV) that was 10.7 cd/m².

Thus, the europium complex of formula (IV) demonstrates a greater degree (intensity) of lightfastness, and a lower loss of lightfastness intensity, than europium-tris-benzoyltrifluoro-acetone. This occurred even though the molar concentration of the solution containing formula (IV) was lower than the molar concentration of europium-tris-benzoyltrifluoro-acetone ($2.2 \times 10^{-4}$ mol versus $6 \times 10^{-4}$ mol, respectively).

An additional advantage of the rare earth metal complexes of formula (I) is that these do not need to contain fluorine groups in order to produce bright emissions when irradiated under long UV wavelength light, although the complexes may contain fluorine groups. The rare earth metal complexes without fluorine groups are believed to be less adverse to the environment than rare earth metal complexes having fluorine groups.

Europium bis(2,2'-bipyridine-N,N')-trinitrate, Combined with a Diketone Dopant

In another embodiment, the present disclosure also provides new formulations or compositions of europium bis(2,2'-bipyridine-N,N')-trinitrate, represented by the formula $Eu(Dpy)_2(NO_3)_3$, combined with one or more dopants. The dopants are preferably diketone dopants, or the isomers, tautomers, and/or derivatives thereof. More preferably, the diketone dopants are selected from the group consisting of thenoyltrifluoroacetonate, benzoyltrifluoroacetonate, naphthoyltrifluoroacetonate, dibenzoylmethane, and/or combinations thereof.

By itself, $Eu(Dpy)_2(NO_3)_3$ is a slightly water-soluble, high melting salt that is only excitable under short UV light (about 254 nm). In a mixture containing 30% ethanol/70% water, $Eu(Dpy)_2(NO_3)_3$ shows intensive emission only under short UV light. However, after doping this solution with a diketone dopant, including, but not limited to, thenoyltrifluoroacetonate, benzoyltrifluoroacetonate, naphthoyltrifluoroacetonate, dibenzoylmethane, and/or combinations thereof, the excitation spectrum is shifted to long-wavelength UV light.

Most europium complexes containing the diketones as dopants cannot be used directly in a 30% ethanol mixture due to their insolubility, and cannot achieve detectable fluorescent solutions. However, in the new complexes, the $Eu(Dpy)_2(NO_3)_3$ salt acts as a solubilizer for the chelating diketone dopants. As such, in ethanol/water mixtures (30/70), the diketone-doped europium dipyridyl nitrates, are excitable in the long UV light showing red fluorescence, and thus can be used in ink jet applications.

While most europium complexes prepared from sulfonated ligands are very water-soluble, they do not demonstrate good storage stability in ethanol/water solutions. Under accelerated conditions (about 50° C.), these complexes are destroyed within a very short time. By-product precipitation is observed, and no more fluorescent properties are found. However, the complexes of $Eu(Dpy)_2(NO_3)_3$ and diketone dopants demonstrate excellent stability at 50° C. Even after eight days at this temperature, there was no loss of fluorescence intensity.

Europium bis(2,2'-bipyridine-N,N')-trinitrate complexes doped with diketones have good solubility in water and in organic solvents, and are invisible under normal lighting conditions, yet fluoresce when irradiated with long UV wavelength light. Eu(Dpy)$_2$(NO$_3$)$_3$ doped with diketones may be used as a pigment, dye or colorant, and may be used as inks for printing, and for security applications.

The dopant used includes diketone dopants, and/or the isomers, tautomers, or derivatives thereof. Diketone dopants include, but are not limited to, thenoyltrifluoroacetonate

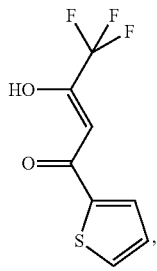

benzoyltrifluoroacetonate

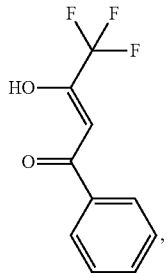 [SMILES: O=C(/C=C(\O)C(F)(F)F)c1ccccc1]

naphthoyltrifluoroacetonate

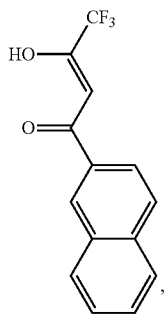 [SMILES: O=C(/C=C(\O)C(F)(F)F)c1ccc2ccccc2c1]

dibenzoylmethane

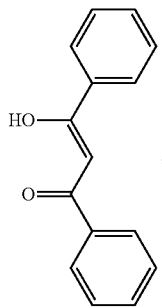

, and combinations thereof.

When the rare earth metal complexes of the present disclosure are irradiated with an ultraviolet light source, the complexes emit fluorescence in the visible spectrum, making these complexes particularly useful as pigments, dyes, and/or colorants used for security applications, such as uses for security inks and fibers.

The range of wavelengths of emitted fluorescence for the present rare earth metal complexes varies from about 400 nm to about 620 nm. For example, the europium complexes of formula (I) exhibit bright fluorescence at about 610 to about 615 nm.

The rare earth metal complexes of the present disclosure show a high degree of lightfastness that is particularly useful as an ultraviolet-type excitation fluorescent developer for ink compositions. The lightfastness makes the present rare earth metal complexes useful generally as pigments in security applications, and more particularly for use in security inks and fibers, inks, inkjet inks, fluorescent inks, colored paints, colorless paints, mass coloring polymers, films, coatings, and dispersions. The present rare earth metal complexes also have utility as pigments used in data carriers, security markings, paper, spun fibers, dyed fibers, biochemistry tracers, and displays.

For example, ink compositions comprising the rare earth metal complexes of formula (I) and/or of Eu(Dpy)$_2$(NO3)$_3$ can be applied as an indicium to a variety of substrates, including, but not limited to, currency, passports, chip cards, checks, check cards, debit cards, identity cards, certificates, bank notes, for authentication, in postal and automation applications, and the like.

The present disclosure also provides compositions containing the rare earth metal complexes of formula (I). Such compositions comprise:

(1) at least one rare earth metal complex represented by formula (I):

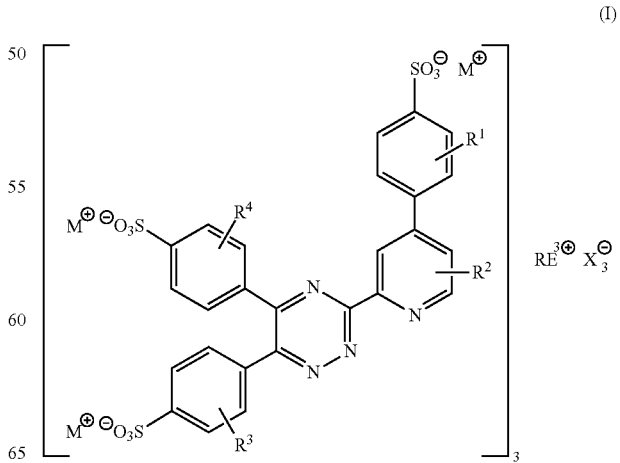

wherein:

M is a cation;

RE is a rare earth metal selected from Eu, Gd, Tb, and mixtures thereof;

X is a counter anion; and each $R^1$, $R^2$, $R^3$, and $R^4$ is independently selected from hydrogen, alkyl of 1-8 carbon atoms, aryl, halo, and alkoxy; and (2) a carrier.

The compositions of the present disclosure can be obtained by dissolving a rare earth metal complex of formula (I) and/or of $Eu(Dpy)_2(NO3)_3$ in a liquid medium. Alternatively, the compositions can be obtained by adding the rare earth metal complex to a solid, as by mixing or grinding.

Suitable liquid media used in the compositions may be an inorganic solvent and/or an organic solvent. An example of an inorganic solvent is water. Examples of suitable organic carriers include, but are not limited to, alcohols, glycols, ether alcohols, sulfoxides, amides, amines, heterocycles, ketones, ethers, esters, nitrites and hydrocarbons. A preferred organic solvent is an aliphatic alcohol. If the complexes of the present disclosure are not sufficiently soluble in the aliphatic alcohol solvent, a mixture of the aliphatic alcohol solvent and additional solvents, such as an ester (e.g., ethyl acetate) or a ketone (e.g., methylethylketone) may be used.

The compositions of the rare earth metal complexes of the present disclosure have at least one carrier. Preferred carriers are those substances in which such rare earth complexes are sufficiently soluble and stable. Such compositions may be used as ink compositions for printing. The carrier should preferably be a substance that readily evaporates from, or is absorbed by, the substrate onto which the composition is applied.

The rare earth metal complexes of formula (I) and/or of $Eu(Dpy)_2(NO3)_3$ are present in the composition in any suitable amount, generally in an amount of from about 0.001 wt % to about 15 wt %, preferably from about 0.01 wt % to about 3 wt %, based on the total weight of the composition. The amount of the rare earth complex should provide an acceptable amount of light emission sufficient to detect the emission, either by the unaided eye or by an electronic image device that is capable of detecting such fluorescence. However, using a very large amount of the rare earth complex in the composition may cause a type of self-absorption resulting in reduction of emission intensity, and should be avoided.

For ink compositions requiring increased stability, or to prevent the ink from drying prematurely, the ink compositions of the present disclosure may include at least one high boiling point solvent, such as ethers (e.g., ethylene glycol monomethyl ether, ethylene glycol monoethyl ether, propylene glycol monomethylether), or aliphatic polyols (e.g., 1,2-hexanediol, 2,4,6-hexanetriol), and/or combinations thereof.

A binder resin may also be included in the compositions in order to properly fix the rare earth complexes of the present disclosure. The binder resin preferably has good solubility in the solvent, and the viscosity of the composition may be suitably adjusted when the binder resin is included in the composition. Specific examples of preferred binder resins include, but are not limited to: polyvinyl resins, such as polyvinyl alcohol, polyvinyl butyral, polyvinyl pyrrolidone, and vinyl pyrrolidone-vinyl acetate copolymers; polyamine resins such as polyallylamine, polyvinylamine and polyethyleneimine; polyacrylate resins such as polymethyl acrylate, polyethylene acrylate, polymethyl methacrylate and polyvinyl methacrylate; and amino resins, alkyd resins, epoxy resins, phenol resins, polyesterimide resins, polyamide resins, polyamideimide resins, silicone resins, phenol resins, ketone resins, rosin, rosin-modified resin phenols, maleic acid, fumaric acid resin, and the like; petroleum resins, cellulose resins such as ethyl cellulose and nitrocellulose; and natural resins such as gum arabic, and gelatin.

Particularly preferred binder resins include polyvinyl resins, polyacrylate resins, and polyamine resins, which can be employed for ink compositions used for writing implements, inkjet printers, and printing.

The present disclosure also provides a mark that can be used in printing systems. The mark comprises a rare earth metal complex of formula (I), and/or a europium dipyridyl nitrate complex. The rare earth metal complexes in the mark exhibit an excitation spectrum in the long UV wavelength ranges, which are between about 350 nm to about 390 nm. The rare earth metal complexes in the mark are soluble in water and in organic solvents, and so are suitable for water-based ink printing systems. The rare earth metal complexes in the mark are fluorine-free, and are environmentally friendly (i.e., less adverse to the environment than complexes that contain fluorine).

An embodiment of a mark of the present disclosure comprises a europium salt, a 5,6-diphenyl-3-(2-pyridyl)-1,2,4-triazine group, and water. A preferred embodiment has a 5,6-diphenyl-3-(2-pyridyl)-1,2,4-triazine group that is 4,4'-[3-[4-(4-sulfophenyl)-2-pyridinyl]-1,2,4-triazine-5,6-diyl] bis benzenesulfonic acid, trisodium salt.

The disclosure also provides for a method for applying the mark to an article of commerce, where the mark comprises a rare earth metal complex of formula (I) and/or a europium dipyridyl nitrate. The mark may be applied to the article of commerce by printing directly onto the article, or by otherwise applying the mark to a substrate that is adhered to the article. The printing is performed by a printer selected from the group consisting of ink jet, thermal, piezo, and laser printers. Examples of articles of commerce to which the mark may be applied include currency, passports, chip cards, checks, check cards, credit cards, debit cards, identity cards, certificates, bank notes, and postal items.

"Ink" (or "inks"), as used herein, means a liquid substance or a dry powder containing pigments that can be used in printing systems to apply an image onto a surface or substrate. As used in the present disclosure, inks include, but are not limited to, liquid inks (such as those used by inkjet printers), as well as toners (such as those used by laser printers). Inkjet inks include, but are not limited to, water-based and solvent-based formulations. The rare earth complexes of formula (I) and/or of $Eu(Dpy)_2(NO3)_3$ may be used as pigments, dyes, and/or colorants in inks and ink compositions.

The rare earth complexes of formula (I) and/or of $Eu(Dpy)_2(NO3)_3$ may also be used as pigments, dyes, and/or colorants in toners. Such toners may contain other materials to allow the toner to bind to a surface when heated. Toners may use resins, wax or similar materials as binders, and the formulation may also include release agents, charge control agents, and other additives. Such toners can be made by the conventional toner method or the chemically processed toner (CPT) method. Toner particles can be very small (one micron or smaller) so that the actual volume of a toner particle can be much smaller than the volume of inkjet ink released during the process of printing a single dot. The smallest discernable dot size with a laser type of printer can be adjusted to be smaller or larger, depending on the type of print system used.

The ink compositions comprising the present rare earth metal complexes may be used in a variety of printing systems. The ink compositions are suitable for inkjet printing systems, preferably those systems using thermal inkjet technology, but also may be employed in inkjet printing systems using non-thermal technologies, such as those systems using piezo technology, and/or other ink delivery systems, such as dot matrix technology.

The ink compositions comprising the rare earth metal complexes of formula (I) and/or of $Eu(Dpy)_2(NO3)_3$ offer the advantages of a high degree of lightfastness, invisibility in normal light to the unaided human eye or to electronic detection devices (such as barcode readers or digital camera lens), yet fluoresce when irradiated with a long UV wavelength light source, and also high print quality and reliability.

The ink compositions comprising the rare earth metal complexes of formula (I) and/or of $Eu(Dpy)_2(NO3)_3$ can be used to print images on a wide variety of substrates. The substrates that may be used in the present disclosure include, but are not limited to, paper, cloth, polymers/plastic films (such as polyester resins, polycarbonates and polyethylenes), metals, and glass. Paper substrates may be coated or uncoated, and the ink compositions are particularly useful for financial and security documents (e.g., checks, currency, stocks, bonds, passports, identity cards, and insurance papers).

Example 1

Preparation of Europium bis-(2,2'-bipyridine-N,N')-trinitrate, Combined with One or More Dopants Europium bis-(2,2'-bipyridine-N,N')-trinitrate (2.5 grams) is dissolved in a mixture of 350 g water and 143.75 grams ethanol (99.5%) under slight heat of 30-40° C. ("Solution A"). Applying Solution A to paper without optical brightener, a red fluorescence is only visible by excitation with UV light of 254 nm. Under irradiation with UV light of 366 nm, no signal is visible. One (1) gram of a europium diketonate compound is dissolved in 100 mL of ethanol ("Solution B"). An aliquot of 6.25 grams of Solution B is added to Solution A, with stirring, at room temperature. After standing at room temperature for about 24 hours, the mixture is filtered. The resulting filtrate, when applied to paper without optical brightener, shows a bright red fluorescence under excitation with UV light of 366 nm wavelength.

The present disclosure has been described with particular reference to the embodiments. It should be understood that variations and modifications thereof can be devised by those skilled in the art without departing from the spirit and scope of the present disclosure. Accordingly, the present disclosure embraces all such alternatives, modifications and variations that fall within the scope of the appended claims.

What is claimed is:

1. A rare earth metal complex represented by the formula (I):

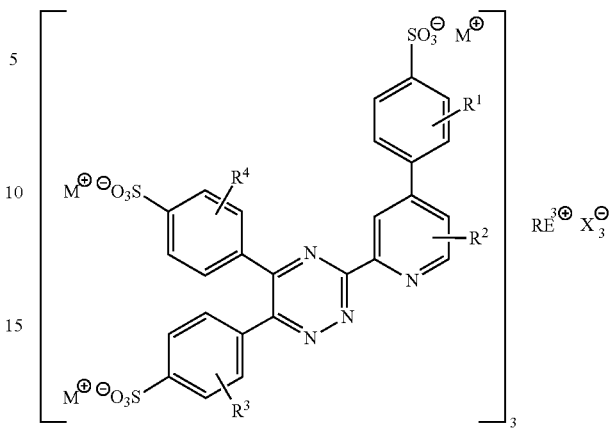

wherein:
M is a cation;
RE is a rare earth metal;
X is a counter anion;
$R^1$, $R^2$, $R^3$, and $R^4$ are each independently selected from the group consisting of hydrogen, alkyl of 1-8 carbon atoms, aryl, halo, and alkoxy; and
said complex fluoresces when irradiated with UV light having a wavelength between 350 nm and 390 nm.

2. The rare earth metal complex according to claim 1, wherein said cation is an alkali metal selected from the group consisting of sodium, potassium, and mixtures thereof.

3. The rare earth metal complex according to claim 1, wherein said rare earth metal is selected from the group consisting of Europium (Eu), Gadolinium (Gd), Terbium (Tb), and mixtures thereof.

4. The rare earth metal complex according to claim 1, wherein said counter anion is a halide.

5. The rare earth metal complex according to claim 1, wherein each of said $R^1$, $R^2$, $R^3$, and $R^4$ is hydrogen.

6. The rare earth metal complex according to claim 1, wherein said rare earth complex is represented by the formula:

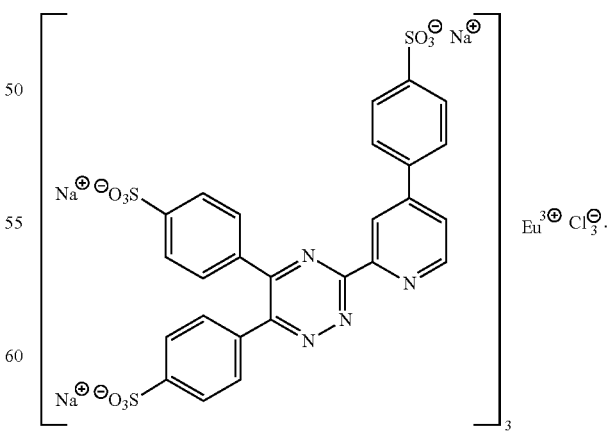

7. The rare earth metal complex according to claim 1, wherein said rare earth complex has a solubility in water and/or water-ethanol mixtures of at least 1 wt %.

8. A process for preparing rare earth metal complexes of formula

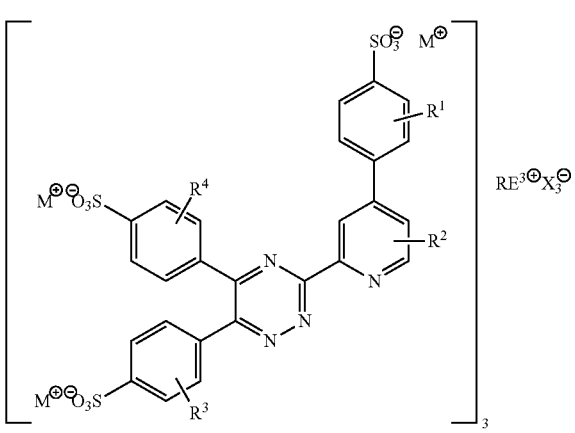

(I)

wherein:
M is a cation;
RE is a rare earth metal;
X is a counter anion; and
$R^1$, $R^2$, $R^3$, and $R^4$ are each independently selected from the group consisting of hydrogen, alkyl of 1-8 carbon atoms, aryl, halo, and alkoxy; and
said complex fluoresces when irradiated with UV light having a wavelength between 350 nm and 390 nm;
wherein said process comprises the step of contacting:
(i) a trialkali salt of a 5,6-diaryl-3-(2-pyridyl)-1,2,4-triazine trisulfonic acid derivative represented by formula (II):

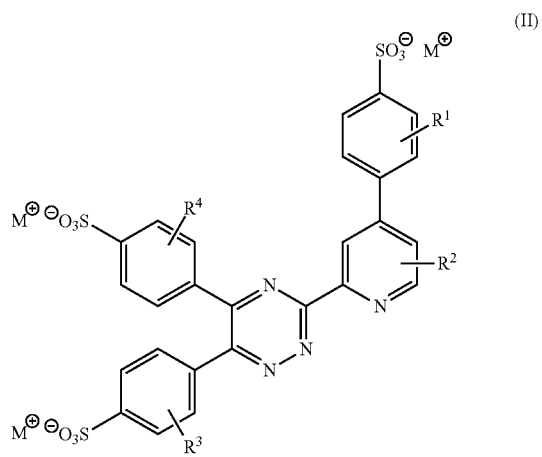

(II)

wherein:
M is a cation; and
$R^1$, $R^2$, $R^3$, and $R^4$ are each independently selected from the group consisting of hydrogen, alkyl of 1-8 carbon atoms, aryl, halo, and alkoxy; and
(ii) a rare earth metal salt represented by the formula:

wherein:
RE is a rare earth metal; and
X is a counter anion;

wherein said step of contacting reactants (i) and (ii) is carried out in the presence of a solvent, and at a temperature and length of time sufficient to produce said rare earth metal complex of formula (I) that fluoresces when irradiated with UV light having a wavelength between 350 nm and 390 nm.

9. The process of preparing rare earth metal complexes according to claim 8, wherein said cation is selected from the group consisting of sodium, potassium, and mixtures thereof.

10. The process of preparing rare earth metal complexes according to claim 8, wherein said counter anion is a halide.

11. The process of preparing rare earth metal complexes according to claim 8, wherein said rare earth metal is selected from the group consisting of Eu, Gd, Tb, and mixtures thereof.

12. The process of preparing rare earth metal complexes according to claim 8, wherein said $R^1$, $R^2$, $R^3$, and $R^4$ are each hydrogen.

13. A composition comprising the rare earth metal complex of formula (I) according to claim 1, wherein said composition is selected from the group consisting of ink, inkjet ink, fluorescent ink, colored paint, mass coloring polymer, coating, dispersion, and security marking.

14. A composition comprising:
at least one rare earth metal complex of formula (I) according to claim 1; and
at least one carrier,
wherein said carrier comprises a solvent.

15. The composition according to claim 14, wherein said rare earth metal complex of formula (I) comprises about 0.001% to about 15.0% by weight of the total weight of the composition.

16. The composition according to claim 14, wherein said carrier is an ink composition.

17. The composition according to claim 16, wherein said ink composition is used in a printer selected from the group consisting of: inkjet printers, thermal printers, piezo printers, and laser printers.

18. A method of using the rare earth metal complex of formula (I) according to claim 1, comprising printing said rare earth metal complex onto an article.

19. The method according to claim 18, wherein said article is selected from the group consisting of currency, passports, chip cards, checks, check cards, credit cards, debit cards, identity cards, certificates, bank notes, and postal items.

20. A mark comprising the rare earth metal complex of formula (I) according to claim 1, wherein said mark is soluble in water-based ink jet systems.

21. The mark according to claim 20, wherein said rare earth metal complex is fluorine-free.

22. The mark according to claim 20, wherein said rare earth metal complex comprises
a europium salt;
a 5,6-diphenyl-3-(2-pyridinyl)-1,2,4-triazine group; and
water.

23. The mark according to claim 22, wherein said 5,6-diphenyl-3-(2-pyridinyl)-1,2,4-triazine group is 4,4'-[3-[4-(4-sulfophenyl)-2-pyridinyl]-1,2,4-triazine-5,6-diphenyl]-bis-benzenesulfonic acid, trisodium salt.

24. An article of commerce comprising the mark according to claim 20, wherein at least one article of commerce is selected from the group consisting of currency, passports, chip cards, checks, check cards, credit cards, debit cards, identity cards, certificates, bank notes, and postal items.

25. A method for applying the mark according to claim 20 to an article of commerce comprising printing said mark on said article of commerce.

26. The method according to claim 25, wherein said printing is by a printer, wherein said printers is at least one selected from the group consisting of inkjet printers, thermal printers, piezo printers, and laser printers.

27. An article comprising the rare earth metal complex of formula (I) according to claim 1, wherein said article is selected from the group consisting of film, data carrier, paper, spun fiber, dyed fiber, biochemistry tracer, and display.

\* \* \* \* \*